(12) United States Patent
Conner et al.

(10) Patent No.: US 6,547,304 B1
(45) Date of Patent: Apr. 15, 2003

(54) GOLF CART COVER, COMPONENTS THEREFOR AND METHODS OF MAKING THE SAME

(76) Inventors: David A. Conner, Rte. 3, Box 294, Purdy, MO (US) 65623; Woodrow Tracy, Jr., 102 Alamanda, Indian Lakes Estates, FL (US) 33855

( * ) Notice: Subject to any disclaimer, the term of this patent is extended or adjusted under 35 U.S.C. 154(b) by 0 days.

(21) Appl. No.: 10/053,780

(22) Filed: Jan. 19, 2002

Related U.S. Application Data
(60) Provisional application No. 60/270,075, filed on Feb. 20, 2001.

(51) Int. Cl.$^7$ .................................................. B60J 9/00
(52) U.S. Cl. .......................... 296/79; 296/80; 296/145; 280/DIG. 5
(58) Field of Search ................. 296/147, 148, 296/83, 81, 107.01, 107.07, 138, 139, 145, 77.1, 79, 80; 280/DIG. 5

(56) References Cited

U.S. PATENT DOCUMENTS

| | | | |
|---|---|---|---|
| 2,682,427 A | * | 6/1954 | Bright .......................... 296/148 |
| 4,621,859 A | | 11/1986 | Spicher |
| 4,773,694 A | | 9/1988 | Gruber |
| 4,932,714 A | | 6/1990 | Chance |
| 5,203,601 A | | 4/1993 | Guillot |
| 5,217,275 A | | 6/1993 | Ridge |
| 5,259,656 A | | 11/1993 | Carroll |
| 5,310,235 A | | 5/1994 | Seymour et al. |
| 5,388,881 A | | 2/1995 | Spencer et al. |
| 5,393,118 A | | 2/1995 | Welborn |
| 5,429,404 A | * | 7/1995 | King, Sr. ...................... 296/79 |
| 5,529,369 A | * | 6/1996 | Welborn ..................... 296/77.1 |
| 6,158,801 A | * | 12/2000 | Tucker ........................ 296/148 |
| 6,276,745 B1 | * | 8/2001 | Wilson ........................ 296/147 |
| 6,293,610 B1 | * | 9/2001 | Howard ....................... 296/148 |
| 6,439,637 B1 | * | 8/2002 | Tyrer ............................. 296/79 |

* cited by examiner

*Primary Examiner*—D. Glenn Dayoan
*Assistant Examiner*—Jason Morrow
(74) *Attorney, Agent, or Firm*—Richard L. Marsh

(57) ABSTRACT

A cover for a golf cart is removably affixed to an attached frame and existing roof support members of the roof of the cart where the attached frame comprises an upper frame, door posts and at least one removable door. The cover thus provides protection to golfers in a golfer compartment during inclement weather and also provides for convenient access to and from golfer compartment whether through door opening when opened or through the door frame when the door is in a closed position with the cover portion removed therefrom. The door may be stored in at least two positions upon the frame or may be removed from the frame and stored separately.

17 Claims, 6 Drawing Sheets

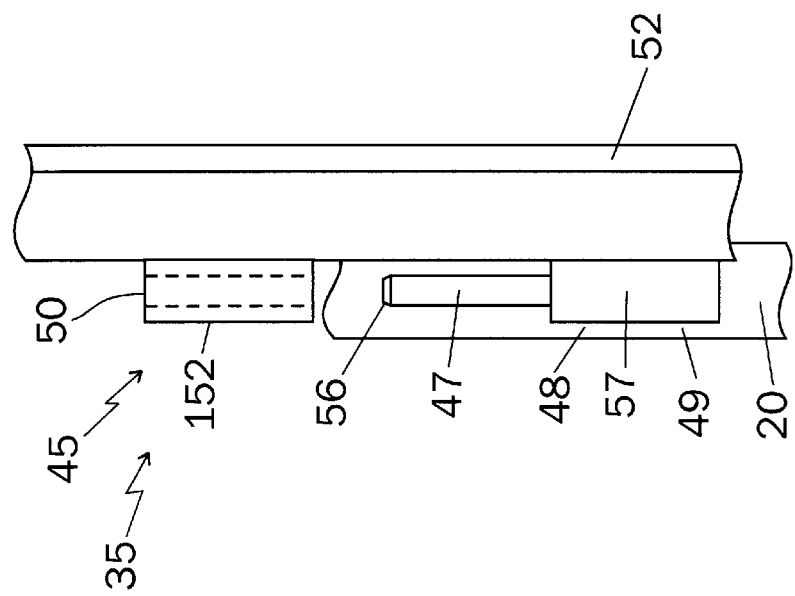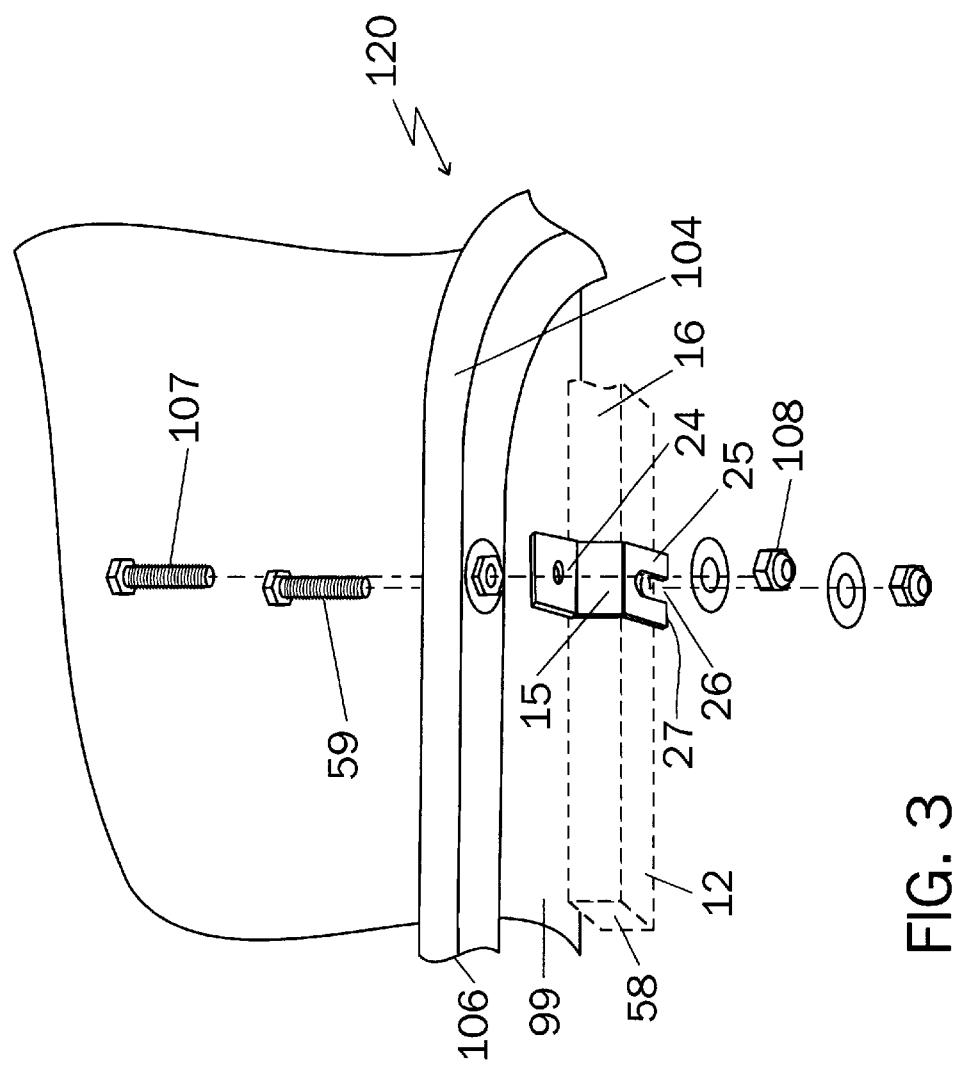

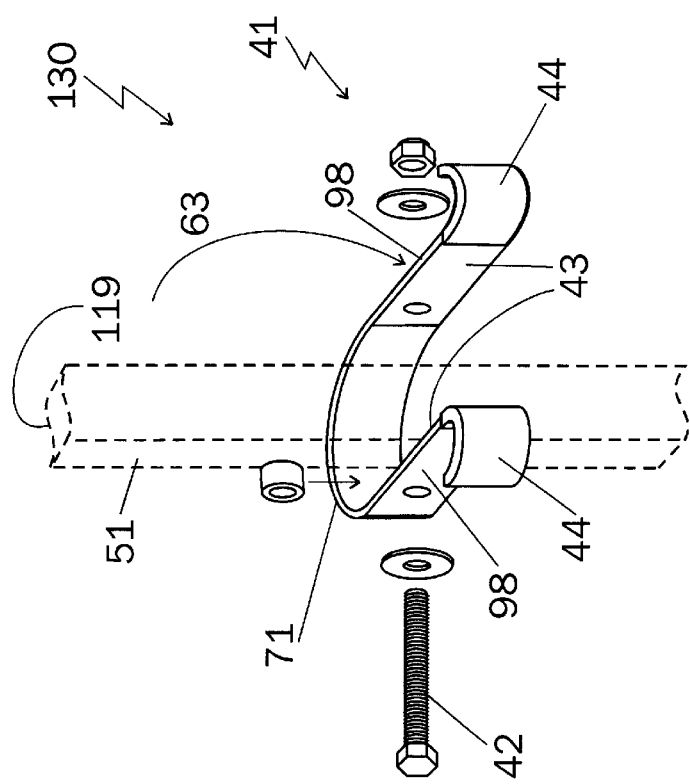
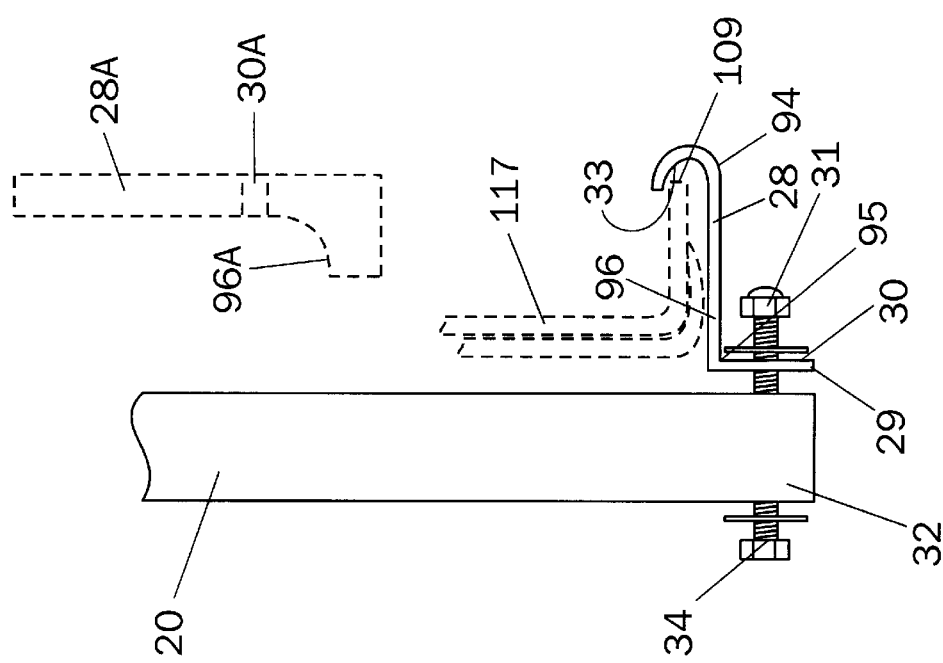
FIG. 4
FIG. 5

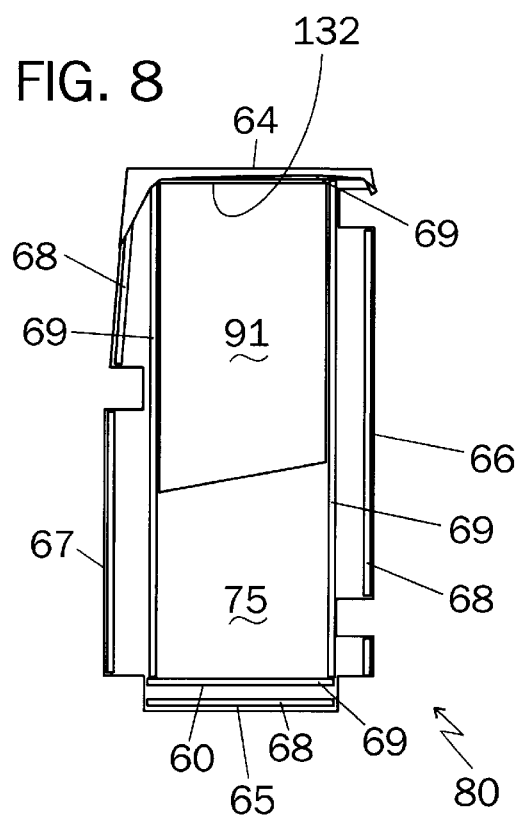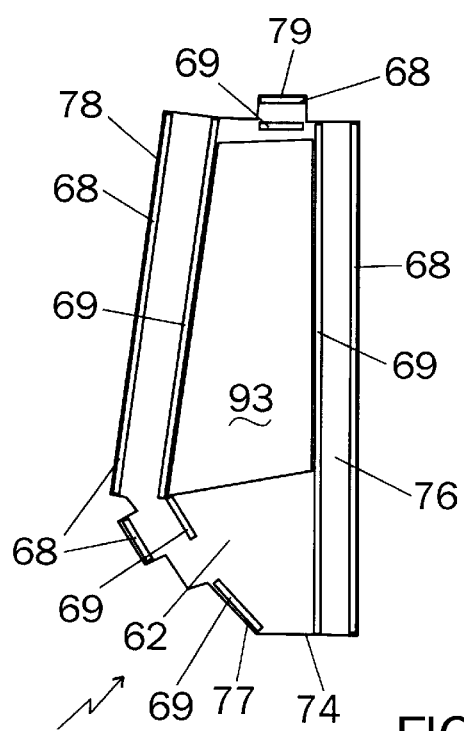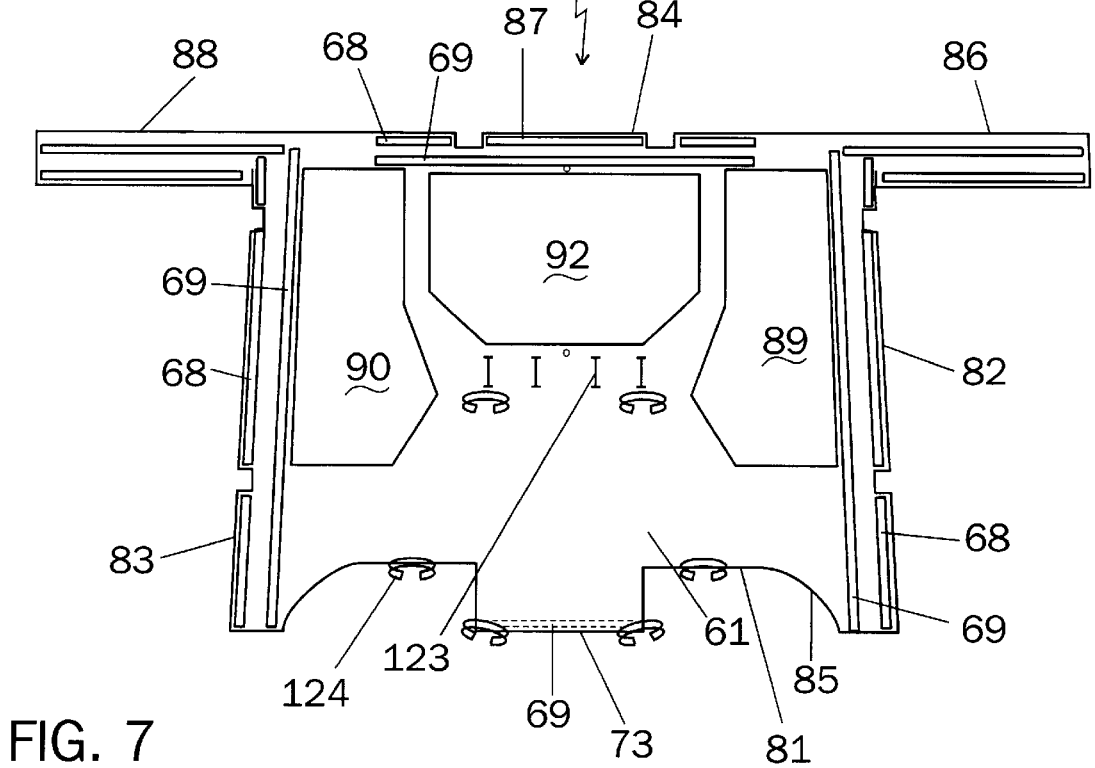

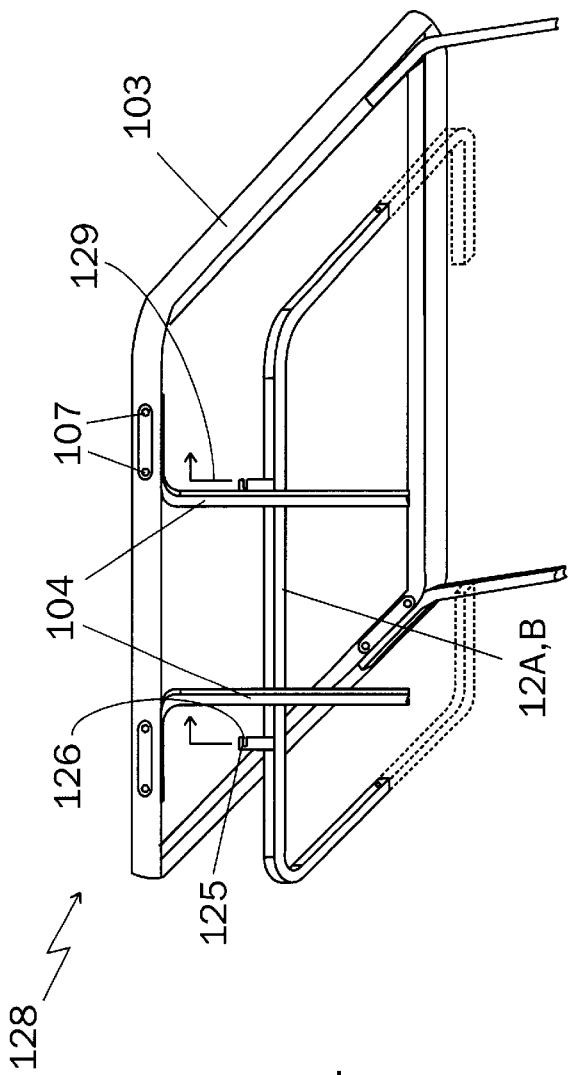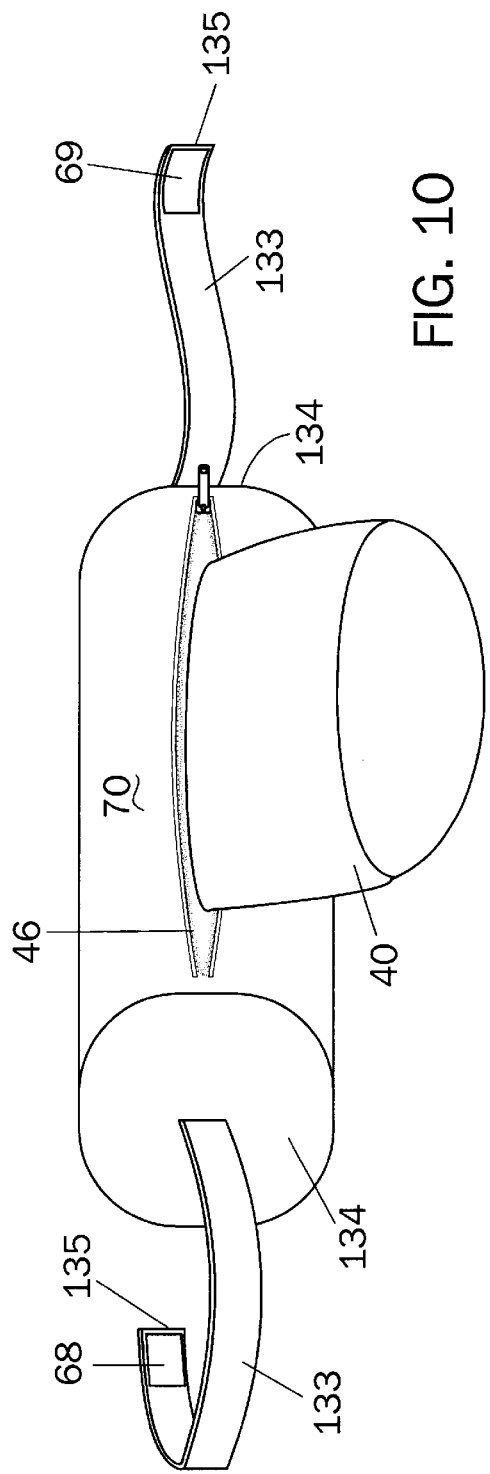

GOLF CART COVER, COMPONENTS THEREFOR AND METHODS OF MAKING THE SAME

This application claims the benefit of provisional application No. 60/270,075, filed Feb. 20, 2001.

BACKGROUND OF THE INVENTION

1. Field of the Invention

This invention relates to a weather resistant cover for a wheeled vehicle, such as a golf cart, having an existing roof structure.

2. Prior Art Statement

It is known to provide a weather shield for a golf cart comprising a pipe frame supporting a roof above a golf cart with additional support members also supported by the golf cart used for hinging a door, securing the door and affixing a front windshield member. A flexible fabric enclosure fits over the frame with a portion of the flexible fabric enclosure comprising the roof. For instance, see the U.S. Pat. No. 4,621,859 issued on Nov. 11, 1986 to Kenneth N. Spicher. This structure is for a wheeled vehicle having no existing roof superstructure nor a windshield.

It is also known to provide a "slip type" enclosure that rests on and covers the existing roof structure with zippered sides adapted for ingress and egress. The enclosure is fastened to the existing roof structure with snaps which have been affixed to the top by drilling into the top. For instance, see the U.S. Pat. No. 4,773,694 issued on Sep. 27, 1988 to Curtis E. Gruber. Drilling into the top and affixing snaps detracts from the appearance of a golf cart and lowers its resale value and ingress and egress from the enclosure is difficult with the sides lowered and zipped together as the zippers must be unzipped the entire length on both edges of each opening in order to effectively mount or dismount from the cart. See also the U.S. Pat. No. 5,217,275 issued on Jun. 8, 1993 to William Ridge who provides a "slip type" cover for a golf cart that can be removed, rolled up and placed in another bag for storage in the golf cart. The cover of Ridge is held onto the golf cart with bungee straps which pass beneath the cart from side to side. Ingress or egress from the cover of Ridge is further complicated by the single zipper.

It is further known to provide a demountable door assembly for a golf cart, however, in order to remove the demountable door assembly, the mounting bracket must be removed from the framework thus requiring considerable time and work. For instance, see U.S. Pat. No. 4,932,714 issued on Jun. 12, 1990 to Harold Chance.

Additionally, it is known to provide a rigid frame for a wheeled vehicle wherein the frame comprises a bottom frame carried by the vehicle frame, a floorboard carried by the bottom frame a plurality of upright supports having one end attached to the bottom frame and the other end supporting a top frame spaced above the bottom frame. The frame is covered with a flexible cover. Like the Spicher patent above, this frame is adapted to fit to an initially open wheeled vehicle and, in fact, rests upon the existing wheel well supports of the wheeled vehicle. The storage of this cover occupies the same space as the wheeled vehicle thus requiring additional storage space. For instance, see the U.S. Pat. No. 5,203,601 issued on Apr. 20, 1993 to Wilmer E. Guillot.

Yet further known is to provide a roll-up panel enclosure for covering a structure having a roof and framework wherein the roll-up enclosure is a slip type fitting over the roof and being attachable with hooks to the bottom of the golf car frame. For instance, see the U.S. Pat. No. 5,259,656 issued on Nov. 9, 1993 to Larry W. Carroll. The Carroll enclosure has the same ingress and egress difficulties as Gruber and Ridge.

Other full "bag type" enclosures for a golf cart are shown in U.S. Pat. No. 5,310,235 issued on May 10, 1994 to Seymour, et al. and Spencer, et al., U.S. Pat. No. 5,388,881 issued on Feb. 14, 1995, however, it is unclear how ingress or egress is possible as the sides adjacent the passenger area appear to be solid. Spencer, et al., is affixed to the golf cart with bungee straps extending from wedging locks on the sides to the fender wells on the cart.

Finally, it is known to provide a door assembly and a golf cart having a top and a door assembly on at least one side of the golf cart wherein the door assembly is a generally C-shaped rigid frame having a top hinge connected at the top open end of the C-shaped frame and a bottom hinge connected at the bottom open end of the C-shaped frame. The hinges are rigidly affixed to the golf cart with sheet metal screws. A flexible cover is connected to the frame and to the cart forming a covered door. Sheet metal screws hold snap fasteners to the golf cart for securing the open edge of the flexible door cover. Another flexible cover extends around the backside of the golf cart and is held on by snap fasteners permanently affixed to the golf cart top and body. For instance, see the U.S. Pat. No. 5,393,118 issued on Feb. 28, 1995 to Robert B. Welborn. The snap type fasteners detract from the appearance of the cart when the cover and/or door is removed.

SUMMARY OF THE INVENTION

A review of the prior art shows a clear need for a weather resistant cover for a golf cart which may be installed or removed in a matter of seconds and wherein the golf cart may be returned to its original condition in a matter of minutes by removing a means for affixing the cover in order to protect the resale value of the golf cart. Therefore, it is an object of this invention to provide a golf cart cover which is removably attached to a framework wherein the framework is removably attached to existing bolts on the golf cart top and further using removable clamps which engage the underneath the golf cart body.

Another object of this invention is to provide a door for a golf cart cover which is removably hinged on a framework wherein the framework is removably attached to existing bolts on the golf cart top and removably engaged with the underneath the golf cart body with removable clamps.

Still another object of this invention is to provide a means for affixing a cover to a golf cart, the means for affixing comprising a header frame attachable to an existing means for mounting a roof to the golf cart, the header frame having downwardly extending frame members affixed thereto, the downwardly extending frame members releasably affixed to an undercarriage of the golf cart.

Additionally, it is an object of this invention to provide a means for affixing a cover to a golf cart comprising a header frame and downwardly extending frame members wherein at least one of the downwardly extending frame members has means for removably mounting a hingeable door frame thereupon, the door frame removably attached to the downwardly extending frame member.

Another feature of this invention is to provide a means for affixing a cover to a golf cart comprising a header frame and downwardly extending frame members wherein the cover comprises multiple fabric portions removably affixed around at least one of existing support posts of the golf cart and secured to the header frame and the downwardly extending frame members.

Still another feature of this invention is to provide a cover for a door frame wherein the door frame has one marginal edge of the door frame hingedly mounted to either a rear door post assembly or a front door post assembly of the golf cart enclosure wherein the door frame is removably hinged upon a means for affixing a cover to a golf cart.

One significant feature of this invention is to provide a door for a golf cart enclosure, wherein the door comprises a door frame, a means for affixing, a means for latching and a cover for the door frame and wherein the door frame comprises top, bottom and side marginal edges secured at the ends thereof in a generally rectangular shape, the means for affixing comprising means for hingedly mounting one marginal edge of the door to a portion of the golf cart enclosure, the means for latching comprising means for latchedly securing another marginal edge of the door to another portion of the golf cart enclosure wherein the cover has means for removably attaching the peripheral edges thereof to the marginal edges of the frame.

An additional object of this invention is to provide a framework for a golf cart cover wherein the framework is removably attached to existing bolts on the golf cart roof and removable clamps which engage the underneath the golf cart body wherein a header frame portion of the framework substantially circumscribes the golf cart roof.

A further object of this invention is to provide a door frame for a golf cart cover wherein the door frame has its fabric portions removed therefrom and is stored in a closed position thus allowing a golfer to step substantially uninhibited through the door frame while stored in the closed position.

An auxiliary object of this invention is to provide a door frame for a golf cart cover, the door frame having fabric portions removably attached thereon wherein the door frame is stored in an open position hingedly rotated substantially one-hundred eighty degrees and standing adjacent a portion of the golf cart body and the roof support, the door frame held in the open position by securing the door to a member near the rear of the golf cart.

An attribute of this invention is to provide a means for affixing a cover to a golf cart wherein the means for affixing may be installed on the golf cart with simple hand tools.

A significant feature of this invention is to provide a means for affixing a cover to a golf cart wherein the means for affixing may be installed on the golf cart without diminishing the resale value of the golf cart when the means for affixing is removed therefrom.

Yet another object of this invention is to provide a means for affixing a cover to a golf cart, the means for affixing comprising a header frame, door support posts and a door frame wherein the header frame, door support posts and door frame allow for free flow movement of air therethrough when flexible fabric portions adapted to be removably received on the header frame, door support posts and door frame are removed therefrom.

Still another characteristic of this invention is to provide a means for affixing a cover to a golf cart, the means for affixing comprising a header frame, door support posts and a door frame wherein means for affixing permits substantially the same free flow movement of air therethrough as is permissible through the golf cart when the means for affixing is removed therefrom after flexible fabric portions adapted to be removably received on the means for affixing are removed therefrom.

A valuable property of this invention is to provide multiple fabric portions separately attachable to a means for affixing a cover to a golf cart to permit one or more of the multiple fabric portions to be removed from the means for affixing wherein the fabric portions removed therefrom are stored onboard the golf cart during a round of golf.

Yet another feature of this invention is to provide multiple fabric portions separately attachable to a means for affixing a cover to a golf cart to permit one or more of the multiple fabric portions to be removed from the means for affixing when damaged and replaced without replacing the entire cover.

Yet an additional characteristic of this invention is to provide a club cover pouch which is removably attached to a rear fabric portion of a golf cart cover wherein the club cover pouch is adapted to receive individual club covers to protect golf clubs from inclement weather.

An aspect of this invention is to provide a fabric portion for the rear part of the golf cart wherein the fabric portion is form-fitted to expose the rear fenders of the golf cart such that auxiliary golfing items may be accessible without removing any portion of the cover.

Other objects, features and characteristics of this invention will become readily apparent to those practicing the game of golf with reference to the following specification, claims and drawings.

BRIEF DESCRIPTION OF THE DRAWINGS

FIG. 3 is an enlarged fragmentary perspective view of the Z-bracket showing a means for affixing the header frame to existing rear roof supports of an EZ-GO golf cart.

FIG. 4 is an enlarged fragmentary view of the terminal end of one downwardly extending frame member showing means for affixing the downwardly extending frame members to the underside of the golf cart body.

FIG. 5 is an enlarged view of the rotatable latch of the removable door.

FIG. 6 is an enlarged view of one of the hinge portions of the removable door spaced above a receiving hinge portion of the frame.

FIG. 7 is a plan view of the rear cover piece showing means for fastening on the marginal edges thereof.

FIG. 8 is a plan view of one door cover piece showing means for fastening on the marginal edges thereof.

FIG. 9 is a plan view of one front cover piece showing means for fastening on the marginal edges thereof.

FIG. 10 is a perspective view of a pouch for receiving golf club heads in separate covers stored therein.

FIG. 11 is an enlarged fragmentary perspective view of a means for affixing a header frame to existing roof supports of a golf cart manufactured by CLUB CAR or YAMAHA.

DESCRIPTION OF THE PREFERRED EMBODIMENTS

While the various features of this invention are hereinafter described and illustrated as a frame for removably affixing a cover to a golf cart wherein the frame comprises a header frame and downwardly extending frame members, the header frame removably attachable to an existing means for mounting a roof to the golf cart and the downwardly extending frame members releasably affixed to an undercarriage of the golf cart, it is to be understood that the various features of this invention can be used singly or in various combinations thereof means for affixing a cover to a golf cart as can hereinafter be appreciated from a reading of the following description.

Figure 1:
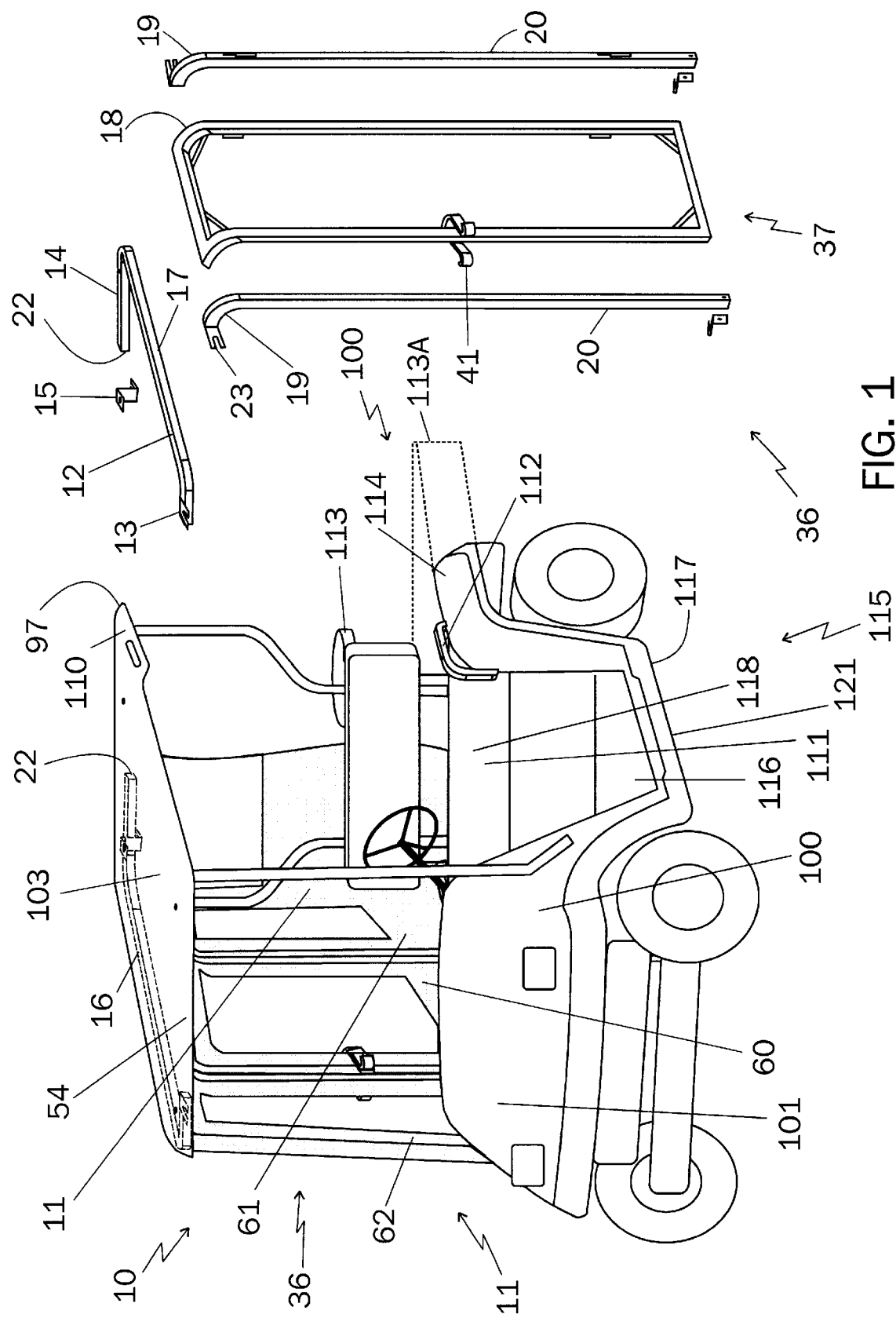
FIG. 1 is a partially exploded perspective view of an EZ-GO golf cart with the right-hand side of the preferred embodiment of the frame, as viewed from inside the golf cart, attached to the golf cart showing portions of the cover affixed to that portion of the frame and further showing the left-hand side of the frame spaced away from the golf cart with the left-hand side door removed from the frame.
Figure 2:
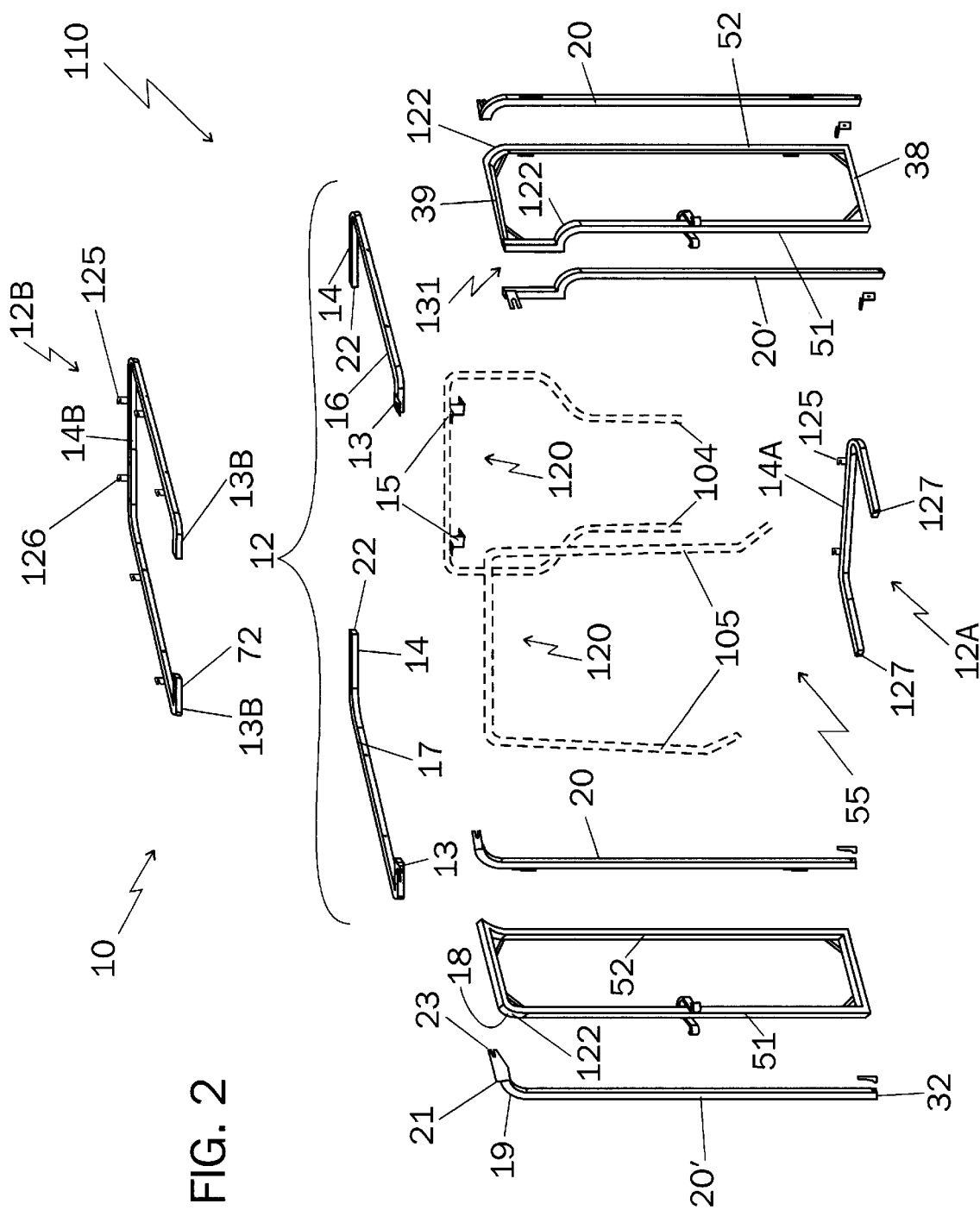
FIG. 2 is a perspective view of the separate headers for different golf carts showing the frame members of some embodiments removed from the golf cart with existing roof supports for an EZ-GO golf cart shown as dashed lines.

Referring now to FIGS. 1 and 2, most conventional golf carts 100 usually comprise a body 101, a golfer compartment 115 having a seat 111 and a driver station 118, a roof 103 spaced above golfer compartment 115 and a club bag carrier 113 behind golfer compartment 115. Modifications may comprise utility racks or trays 113A added to a cart such that it may be used for maintenance, hauling or the like. Hereinafter, golf cart 100 refers to any such cart built upon a golf cart frame. Roof 103 is supported above body 101 and over golfer compartment 115 usually by windshield supports 105 and roof supports 104 to provide limited protection to the golfers in golfer compartment 115, the limited protection generally comprising a shaded area and precipitation protection from moisture falling generally straight downwardly. Little protection is provided to golfer compartment 115 from wind or precipitation having a horizontal disposition and thus it is desirable to provide some protection to golfers in golfer compartment 115 during inclement weather. Furthermore, club bag carrier 113 may be outside the edge 110 of roof 103 and thus also unprotected from inclement weather. Roof 103 is supported above body 101 on roof supports 104 and windshield supports 105 wherein windshield supports 105 have a rigid, clear sight glass or windshield (not shown) disposed therebetween, this windshield generally spanning the vertical distance between body 101 and roof 103 and the horizontal distance between windshield supports 105 though the windshield may further be divided into parts along at least one horizontal line, as is well known in the art, to provide for free flow of air into and through golfer compartment 115. The limited protection from the elements has long been a concern of golfers and the prior art listed above is replete with various means of protecting golfers in golfer compartment 115, however, most previous covers require unzipping a long zipper in order to gain access to golfer compartment which then requires that the golfer close the zipper upon entering. This time consuming task detracts from the game as removal of a cover of the prior art is cumbersome to the golfer. Therefore, a means 10 for affixing a cover 11 to golf cart 100 generally shown in the Figures has been developed by the instant inventors wherein means 10 for affixing comprises a header frame 12, 12A, 12B, door posts 20, 20', at least one removable door 36 and roof support members 104, 105 of roof 103. Header frame 12 is adapted to fit upon golf carts manufactured by EZ-GO while header frames 12A and 12B are adapted for various model years of golf carts manufactured by CLUB CAR or YAMAHA, these trademarks owned by the respective company. Cover 11 is disposed around and removably affixed to means 10 for affixing to provide protection to golfers in golfer compartment 115 and for convenient access to and from golfer compartment 115 whether through door 36 when opened or through door frame 37 when door 36 is in a closed position with cover portion 60 removed therefrom. It will become readily apparent that door 36 may be stored in at least two positions upon means 10 for affixing or may be removed for separate storage.

Now referring also to FIGS. 2, 3 and 4, header frame 12 for an EZ-GO golf cart preferably comprises two C-shaped headers 16, 17 which are attachable to an existing means 120 for mounting roof 103 to golf cart 100. Though headers 16, 17 are separate pieces, headers 16, 17 substantially circumscribe the entirety of side edges 110 and rear edge 97 of roof 103 just inside edge 110 of roof 103. Though preferably separate, headers 16, 17 may be joined at the terminal ends 22 thereof between rear roof supports 104 of golf cart 100. Means 120 for mounting generally comprises roof bolts 107 passing through a portion of roof 103 and affixed to roof supports 104 and windshield supports 105 with nuts 108. Means 10 for affixing also comprises four door posts 20, 20' which are adapted to engage body 101 of golf cart 100. Hereinafter, header frame 12 shall refer to either header 16 or 17 as headers 16, 17 are mirror image components of means 10 for affixing, door post 20 shall refer to either the right-hand or left-hand door frame hinge support and door post 20' shall refer to either the right-hand or left-hand door latch support. Header frame 12 has one end 21 of door posts 20, 20' affixed thereto at attachment 23 with door posts 20, 20' having an opposite end 32 releasably affixed to an undercarriage 117 of golf cart 100. At least one door post 20 has means 35 for removably mounting a hinged door 36 thereupon, door 36 comprising a door frame 37, a removable cover portion 60 and a means for latching 130. Roof support members 104, 105 cooperate with door posts 20, 20' and header frame 12 for receiving removable cover portions 60–62 thus completely enclosing golf cart 100 with golf cart cover 11. For instance, in FIGS. 1 and 2, it is readily observed that fabric portion 60 is removably attached to bottom member 38, top member 39, latch member 51 and hinge member 52 of door frame 37. Likewise, cover portion 61 is removably attached to door post 20 on the left side (as viewed looking forward from golfer compartment 115) around both rear roof supports 104 near the rear of golf cart 100 and affixed to right side door post 20. Rear cover portion 61 also has a pouch 70, see FIG. 10, for receiving golf bag covers 40 therein wherein pouch 70 is removably attached to cover portion 61, preferably with a hook and loop fastener. The function and details of pouch 70 will be hereinafter fully explained in the description of the elements of FIG. 10. Cover portion 62 is affixed between door post 20' and windshield support 105. It is readily apparent here that door cover portion 60 and front cover portion 62 are mirror images and duplicated on the opposite sides of means 10 for affixing cover 11 to golf cart 10. When cover portions 60–62 are removed from means 10 for affixing, golf cart 100 is substantially returned to its pre-cover original condition of an open design to maximize air flow and simplify entry and exit from golf cart 100.

Means 120 for mounting roof 103 to golf cart 100 comprises roof supports 104 and windshield supports 105 with bolts 107 passing through roof 103, through defined holes in each of supports 104, 105 and secured thereto with a nut 108. Specifically referring to FIG. 3, means 10 for affixing is supported on roof supports 104 using a Z-bracket 15 using the existing bolt 107 passing through support 104. To clearly show the details below, roof 103 has been cut through adjacent end 106 of roof support 104 showing end 58 of header 16 and the attachment of Z-bracket 15 with bolt 107 and header bolt 59. Z-bracket 15 has a slot 26 into end 27 for readily affixing means 10 for affixing to header 12, slot 26 accommodating the slight variations in the mounting of roof 103 of golf cart 100. Generally, roof supports 104, 105 are disposed inwardly of edge 110 of roof 103 thus leaving a space 99 between roof support 104 and roof edge 110, this space 99 being sufficiently wide to accommodate header frame 12 of means 10 for affixing cover 11 to golf cart 100 and allowing for ease in affixing removable cover portions 61, 62 to header frame 12. Though only one means 120 for mounting roof 103 to golf cart 100 comprising inwardly turned end 106 of support 104, bolt 107 and nut 108 is shown in FIG. 3, each means 120 for mounting is similar, however, no Z-bracket is used at windshield supports 105. At windshield support 105, frontispiece 13 of header 16 is turned inwardly toward the windshield and lies along windshield support 105 behind front edge 54 of roof 103. Nut 108 is then removed from bolt 107 at windshield support 105 and frontispiece 13 is mounted upon bolt 107 with nut 108 replaced thereupon securing frontispiece 13 of header 16 to windshield support 105. Header 17 is similarly attached to windshield support 105 on the right side of golf cart 100.

Still referring to FIGS. 1–4 for means 10 for an EZ-GO golf cart, frame 55 of means 10 for affixing thus comprises two halves, each half comprising a header 16 or 17 and two door posts 20, 20'. Z-brackets 15 are attached to rear roof supports 104 by affixing leg 24 to existing bolt 107 by placing an additional nut 108 on the open end of bolt 107 after placing leg 24 thereon. Z-bracket 15 may also be affixed adjacent rear roof support 104 by removing nut 108 from bolt 107, placing leg 24 thereon and replacing nut 108. Frame 55 is then placed upon golf cart 100 by moving each half of frame 55 inwardly from the respective side of golf cart 100 with each header 16, 17 placed under roof edge 110 along both sides of roof 103, with frontispiece 13 extending just behind front edge 54 and under windshield support 105 with rear portion 14 extending along and underside of rear edge 97 of roof 103, rear portion 14 extending substantially halfway across rear edge 97 of roof 103 such that slot 26 in Z-bracket 15 may receive bolt 59 therein. Thus headers 16, 17 of frame 55 are placed around roof supports 104 behind windshield supports 105. When the halves of frame 55 are each generally arranged in position for attachment to means 120 for mounting, rear portion 14 is moved forwardly into position while resting upon slotted members 25 of Z-brackets 15 wherein bolts 59 are received into ends 27 of each slotted member 25 of attachment Z-brackets 15 and with a bolt hole 72 in frontispiece 13 aligned longitudinally with each bolt 107 in windshield supports 105. Each half of frame 55 is then moved slightly forward thus placing slot 26 of each slotted member 25 around bolt 59 at rear roof support 104 and under bolt 107 in windshield support 105. Frontispiece 13 is then slipped over bolt 107 at windshield support 105 and nuts 108 are then re-threaded and tightened upon bolts 107 to removably affix attachment headers 16, 17 to existing means 120 for mounting. Thereafter, door posts 20, 20' are raised slightly, if necessary, with clamping member 28 disposed beneath floor 116 engaging undercarriage 117. As can be readily appreciated, clamping member 28 is adapted to be tightened against undercarriage 117 thus fully clamping lower end 32 of door post 20, 20' to golf cart 100 thereby securing the last remaining part of frame 55 of means 10 for affixing a cover 11.

Attaching means 10 for affixing to a golf cart manufactured by CLUB CAR or YAMAHA proceeds in a similar fashion however, there are slight differences in the frame members 12, 20, 20' and the methods of attaching. For instance, still referring to FIG. 2 and also to FIG. 11, header frame 12A is shown for earlier models of golf carts manufactured by CLUB CAR or YAMAHA wherein header frame 12A circumscribes the rear edge 96 and only a portion of side edges 110 of the existing roof 103. For these models, door post 20 affixes to the terminal end 127 of header frame 12A while front door posts 20' are affixed directly to bolts 107 holding roof 103 onto windshield supports 105. First, all nuts 108 are loosened from bolts 107 to provide clearance between supports 104, 105 and roof 103. Header frame 12A is then positioned underneath roof 103 with tabs 125 forced alongside the inside edge of supports 104 between supports 104 and roof 103 with slots 126 of tabs 125 sliding around bolts 107. Thereafter, nuts 108 may be secured to bolts 107 along rear roof edge 97. Door post 20 is then attached to terminal end 127 of header frame 12A with a bolt 59 passing through header frame 12A wherein bolt 59 receives a slot of attachment 23 therearound. A nut 108 is then secured to the end of bolt 59 securing attachment 23 to header frame 12A. Front door post 20' is affixed to one bolt 107 of windshield support 105 by passing attachment 23 between roof 103 and windshield support 105 with the slot in the end of attachment 23 surrounding bolt 107. Thereafter, nut 108 is re-tightened onto bolt 107 capturing attachment 23 between roof 103 and windshield support 105. Door posts 20, 20' are then raised engaging clamping member 28A with underside 117 of golf cart 100 wherein nut 34 is tightened against door post 20, 20' to clamp lower end 32 thereof to underside 117.

For later model golf carts manufactured by CLUB CAR and YAMAHA, upper header 12B comprises an encircling header similar to that used for EZ-GO however, header 12B has tabs 125 with slots 126 therein for mounting header 12B to existing bolts 107 of roof 103. In one embodiment, header 12B is divided in rear portion 14B into two C-shaped frame portions similar to C-shaped headers 16, 17 for ease of packing and shipping, the extensions of frame 12B shown in dashed lines. Installation of header 12B is similar to that of header 12A but slots 126 of tabs 125 are passed between roof 103 and roof supports 104, 105 at each pair of roof attaching locations 128 wherein one bolt 107 receives slot 126 therearound. As shown in FIG. 11, tab 125 is forced between roof 103 and rear roof support 104 on the inside thereof and moved to the right as shown by the arrows 129 engaging slot 126 of tab 125 around the innermost bolt 107 of each pair of roof attaching locations 128. Door posts 20, 20' are then affixed to upper header 12B with a bolt passing through attachment 23 and header 12B. Alternately, header 12B may have studs protruding therefrom for receiving attachment 23. Door posts 20, 20' are raised into position and secured to underside 117 in a manner similar to assembly to other carts. Securing cover 11 to frame 55 comprising header 12A or 12B, door posts 20, 20', rear roof supports 104 and windshield supports 105 is similar for all golf carts 100. Likewise, hanging of door 36 upon door post 20 is similar for all golf carts 100.

Referring now to FIG. 4, clamping member 28 comprises an inwardly curved end 33, a reach 96 and an engaging member 29, engaging member 29 disposed at one end 95 of reach 96 with curved end 33 disposed at the other end 94 thereof. Engaging member 29 has a bolt hole 30 disposed therethrough for attaching clamping member 28 to lower end 32 of door post 20, 20' and securely holding door post 20, 20' onto undercarriage 117. Clamping member 28 may be made of spring stock such that inwardly curved end 33 provides a constant force against undercarriage 117 and further holds lower end 32 against the inside edge 109 of undercarriage 117, however, clamping member 28 is generally a section of 1" wide steel strap approximately ⅛" thick bent into the configuration shows in FIG. 4. Preferably, bolt 31 is passed through a hole in lower end 32 of door post 20, 20' and is adapted to receive nut 34 thereon after clamping member 28 is hooked under undercarriage 117. Nut 34, when threaded upon bolt 31 and tightened thereon holds engaging member 29 of clamping member 28 against door post 20, 20'. Though bolt 31 is preferably used, a stud may project from lower end 32 through hole 30 of engaging member 29 to accomplish the same purpose of holding door post 20, 20' onto undercarriage 117. On some gasoline powered models of golf carts 100, a longer reach 96 is provided for clamping member 28 such that clamping member 28 may engage a frame member disposed inwardly of edge 121 of underside 117. It should be readily apparent that clamping member 28 may be revised to provide for a longer reach 96 in order to accommodate various golf cart configurations. An alternate clamping member 28A is shown in dashed lines spaced above clamping member 28, clamping member 28A preferably used on golf carts manufactured by CLUB CAR and YAMAHA wherein clamping member 28A is loosely held on door post 20, 20' by bolt 31 through hole 30A wherein clamping member 28A may be rotated upwardly after lifting door post 20, 20' into engagement with underside 117. Nut 34 is then secured against door frame 20, 20' clamping door post 20, 20' to golf cart body 101 alongside side edge 121. It has been demonstrated by the inventors hereof that frame 55 may be placed upon golf cart 100 and affixed thereto in less than ten minutes and as cover portions 60–62 may be secured to frame 55 in less than four minutes, only a slight delay in a golf game need be experienced when a golf cart 100 is first outfitted with means 10 for affixing and cover 11.

Referring again to FIGS. 1 and 6, at least one door post 20, 20' of frame 55 has means 35 for removably mounting hingeable door 36 thereupon, door 36 comprising a door frame 37 and removable cover portion 60. In FIG. 1, the right-hand door 36 is shown removed from door post 20 of frame 55 while the left-hand door 36 is shown mounted on door post 20. Referring now to FIG. 6, door post 20, 20' has a frame hinge part 48 comprising a frame hinge pad 49 and a hinge pin 47, frame hinge pad 49 permanently affixed to door post 20 with door hinge pin 47 mounted upon frame hinge pad 49 for receiving door hinge 152 thereon. In order to facilitate removal of door 36 from frame 55, door hinge pin 47 preferably has an open end 56 disposed in an upwardly extending attitude with the lower end 57 of hinge pin 47 affixed to frame hinge pad 49. Open end 56 is adapted to receive a pivot hole 50 of door hinge 152 thereon such that door 36 may freely rotate upon door hinge pin 47. Only one means 35 for removably mounting door 36 has been described here, however, it will be readily appreciated that two, or more means 35 for removably mounting door 36 may be provided on door post 20, 20' for affixing door 36 at at least two locations on door post 20, 20', however, it should also be appreciated that means 35 for removably mounting may comprise one long door hinge pin 47 extending along member 20, 20' for receiving at least one pivot hole 50 of a cooperating means 45 for hingedly mounting thereon. Whether one or more hinge pins 47 and hinge pin receiver holes 50 are provided, door frame 37 of door 36 is hingedly attached to door post 20 and therefore adapted to be rotated about hinge pins 47 or be removed therefrom.

In the preferred embodiment of means 10 for affixing cover 11 to golf cart 100, header frame 12, 12A or 12B and upright frame members 20, 20' remain on golf cart 100 whether or not cover portions 61–62 are affixed thereto. Thus, means 10 for affixing provides for quick attachment of cover portions 61–62 for use of golf cart 100 in inclement weather as cover portions 61–62 may be readily disposed over means 10 for affixing and removably affixed thereto. Preferably, each door 36 also remains hingedly affixed to its respective upright frame member 20 and may likewise have cover portion 60 installed thereon or removed therefrom either before, during or after a game of golf. For instance, cover portions 60–62 may be installed on means 10 for affixing in a matter of minutes, usually less than four minutes, as it is only necessary to affix these cover portions 60–62 to the respective positions on means 10 for affixing as means 10 for affixing, including door frame 37 remain on golf cart 100 at all times. Likewise, cover portions 60–62 may be removed from means 10 for affixing in the same amount of time, or less, than is required for affixing cover portions 60–62 to means for affixing wherein cover portions 60–62 may then be rolled for storage either on golf cart 100 or in a separate location. Methods of affixing cover portions 60–62 to means 10 for affixing will be hereinafter fully explained.

Preferably, two doors 36 are installed on frame 55, one door 36 on either side thereof, each door 36 hingedly affixed to a separate upright frame member 20 as is readily apparent with reference to FIGS. 1 and 2. As each door 36 remains hingedly attached to its respective upright frame members 20, door 36 is stored in a closed position even when door 36 has cover portion 60 removed therefrom. Thus, door 36 with cover portion 60 removed therefrom comprises door frame 37 hingedly attached to upright frame member 20. As door frame 37 is attached to upright frame member 20 preferably adjacent the torso of a golfer sitting on seat 111, ingress and egress through door frame 37 by opening the door with or without having cover portion 60 on door 36 is easily effected. Thus, a golfer may step substantially uninhibited through door frame 37 when door frame 37 of door 36 is stored in the closed position and has cover portion 60 removed therefrom. Though it is preferred that door frame 37 of door 36 be closed and latched against door post 20', door 36 may be stored in an open position by fully rotating door 36 upon hinge pin 47 substantially 180 degrees such that door 36 lies alongside body 101 of golf cart 100 with latch member 51 proximate rear roof support 104. Door 36 may then be secured to rear roof support 104 using a stretchable cord or more preferably with a standoff secured to the clamping member of golf bag carrier 113. This open position may be desirable when the weather is quite changeable and it is desired by the golfers in golf cart 100 to have golf cart 100 fully enclosed with door 36 in a closed position during inclement periods of changeable weather and rotated into a fully open position during relatively pleasant periods without removing cover portion 60 from door 36. Though the preferred configuration has door 36 affixed to rear door post 20, it is entirely within the scope of this invention to hingedly affix door 36 to front door post 20' wherein door 36 is adapted to swing open toward the front of golf cart 100. It should be readily appreciated here that when door 36 has cover portion 60 removed therefrom while door frame 37 remains in a closed position, the occupant of the golf cart may enter and exit from golfing compartment 115 through door frame 37 whether door frame 37 is hinged on rear door post 20 or front door post 20'. This ease of ingress and egress is provided through door frame 37 as door frame 37 has no cross members or other ingress or egress inhibiting factors present in door frame 37 between top member 39 and bottom member 38. Thus, door 36 for means 10 for affixing an enclosure to golf cart 100, comprises frame 37, means 35 for removably mounting, means 130 for latching and cover portion 60 for frame 37, frame 37 comprising top 39, bottom 38 and side members 51, 52 secured at the ends thereof in a generally rectangular shape is provided. Means 35 for removably mounting comprises means 45 for hingedly mounting member 51 or 52 of door 36 to a portion 20 or 20' of means 10 for affixing an enclosure to a golf cart 100 wherein means 130 for latching comprises a latching member 41 for securing another member 52, 51 of door 36 to another portion 20' or 20 of means 10 for affixing an enclosure golf cart 100, cover portion 60 has means 80 for removably securing the peripheral edges 64–67 of cover portion 60 to members 39, 38, 51, 52 respectively of door frame 37. Door 36 may have member 51 hingedly mounted to rear door post assembly 20 or have member 52 hingedly mounted to front door post assembly 20' of means 10 for affixing an enclosure to golf cart 100 as desired by the golfer for instance, by reversing front door post 20' with rear door post 20 such that front door post 20' becomes mounting door post 20 having means 45 for hingedly mounting thereon while rear door post 20 becomes latching door post 20' adapted to receive latching member 41 therearound. As cover portion 60 is readily removable from door frame 37, ingress into and egress from means 10 for affixing an enclosure to golf cart 100 is effected through door frame 37 when cover portion 60 is removed from door frame 37 by removably detaching peripheral edges 64–67 of cover portion 60 from members 39, 38, 51 and 52 respectively of frame 37. Thus, a golfer using golf cart 100 may step substantially unhindered through door frame 37 having cover portion 60 removed therefrom while door 36 is stored in a closed position on golf cart 100.

Door 36 also preferably has means 131 for providing clearance around seating handles 112 of seat 111 mounted within golf cart 100 utilizing means 10 for affixing an enclosure to golf cart 100. Means 131 for providing clearance may comprise an offset or curved portion 122 at a point generally between header 12 and seat handles 112 such that at least member 52 does not interfere with seat handles 112. Thus, offset 122 may be disposed adjacent top end 21 of door frame 37 as shown in FIG. 1 or between top member 39 and latch member 41 as shown on latching member 51 of the right-hand door 36 in FIG. 2. As shown in the right-hand door 36 in FIG. 2, one member 51, 52 of door frame 37 may have offset 122 in one location thereon while the other member 52, 51 may have offset disposed at a different location. Furthermore, offset 122 is shown as a smooth curved portion 19, however, offset 122 may be any other configuration without departing from the scope of this invention.

Referring now to FIGS. 7, 8 and 9, cover 11 comprises multiple fabric portions 60–62 removably affixed to header frame 12, 12A, 12B, upright frame members 20, 20', roof supports 104, 105 and door frame 37. As cover 11 is provided in multiple portions 60–62 wherein cover portions 60 and 62 are replicated for the opposing sides of golf cart 100, cover 11 is actually in five separate pieces. Thus, if damage occurs to one of cover portions 60–62, it is not necessary to replace the entirety of cover 11, merely the cover portion 60–62 that has been damaged providing a great advantage over "slip-type" covers now known in the field. Each cover portion 60–62 is a moisture resistant fabric having means 80 for securing along at least three marginal edges thereof such that each cover portion 60–62 may be removably secured around at least three of the members 16, 17, 20, 20', 104, 105 or 38, 39, 51, 52 of door frame 37. For instance, referring to cover portion 60 in FIG. 8, top marginal edge 64 has portions of the edges thereof affixed together to provide for a pocket 132 adapted to receive upper member 39 therein while bottom marginal edge 65 preferably has mating hook and loop fastener strips sewn thereto with hook portions 68 spaced from loop portions 69 such that when cover portion 60 is placed upon door frame 37, marginal edge 65 wraps around bottom members 38 of door frame 37 with hook portions 68 mating with loop portions 69 thus securing cover portion 60 to the bottom of door frame 37. Pocket 132 may also have a hook or loop fastener strip on the inside thereof adapted to be secured to a mating portion affixed to upper member 39. Likewise, latch and hinge marginal edges 66, 67 respectively are wrapped around latch member 51 and hinge member 52 respectively and secured thereto with hook and loop portions 68, 69 sewn to cover portion 60 along these marginal edges. As shown in FIG. 7, marginal edges 64–67 of cover portion 60 have short strips of hook 68 and loop 69 fasteners sewn thereto with these strips of hook 68 and loop 69 sewn to the inside surface 75 of cover portion 60. Thus, when cover portion 60 is wrapped about door frame 37, hook portions 68 may be readily secured to loop portions 69 individually making placement of cover portion 60 upon frame 37 a simple procedure. Though hook and loop fasteners 68, 69 are preferred, other means 80 of securing such as mating snap portions, buttons & button holes and the like may be alternately used. In like manner, cover 11 comprises cover portion 62 secured around door post 20' with hook and loop fasteners 68, 69 respectively along the marginal edges thereof 76–78 and on a tab 79 wherein marginal edge 76 wraps around door post 20', marginal edges 77 and 78 wrap around windshield support 105 and tab 79 wraps over header 16 or 17 on the respective side of golf cart 100. As marginal edges 76 and 77 come together in close proximity, no hook and loop fastener is provided on the bottom edge 74 of cover portion 62 and only a hook portion is provided for marginal edge 77 as the loop portion thereof is secured to windshield support 105. Cover portion 62 thus cooperates with both windshield support 105 and door post 20' to provide for weather protection to the golfers in golfer compartment 115 by closing the space between door 36 and the windshield. Each of cover portions 60–62 preferably has a clear portion 91–93 respectively for increased visibility with cover 11 installed on means 10 for affixing. Additionally, cover portion 61 may have side curtain clear portions 89, 90. Preferably, clear portion 92 in cover portion 61 has zippered edges such that clear portion 92 may be partially or completely removed from cover portion 61 allowing air flow through golf cart 100 and/or access to a basket mounted on club bag carrier 113.

Cover portion 61 is contoured around fenders 114 for uninhibited access to auxiliary equipment affixed on fenders 114 such as ball washers, extra baskets, drink containers, cleat cleaners or club cleaners. Thus, cover portion 61 has curved cutouts 85 along a portion of the lower marginal edge 81 and therefore, only a lower tab 73 spanning the width between fenders 114 has hook and/or loop fasteners 68 and 69 respectively. Tab 73 is adapted to be affixed around a lower portion (not shown) of golf club carrier 113 by securing short straps 124 around supports for bag carrier 113 and/or around roof supports 104 or against a portion of body 101 under bag carrier 113 wherein a corresponding loop 69 or hook 68 fastener is adhered to body 101. Cover portion 62 has a first marginal edge 83 wrapped around right-hand door post 20 with hook and loop fasteners 68, 69 respectively securing marginal edge 83 around door post 20. A portion 86 of top marginal edge 84 is then passed around header 17 and secured thereto with hook and loop fasteners 68, 69 along portion 86. Cover portion 61 is then passed around rear roof support 104 in front of club carrier 13 but around a basket mounted thereon, around an opposite roof support 104 with marginal edge 82 then wrapped around left door post 20. Slots 123 are provided in cover portion 61 for receiving securing straps of bag carrier 113 therethrough.

Central portion 87 of cover portion 61 is passed over headers 16, 17 along roof edge 110 at rear edge 97 and tab portion 73 is secured to a portion of club bag carrier 113 with securing straps 124 and/or with a loop portion 69 adapted to engage a hook portion 68 secured to golf cart body 101. As portion 86 is secured to right side header 17, portion 88 is secured to left side header 16. With door 36 closed on both sides of golf cart 100, golfer compartment 115 is fully enclosed by cover portions 60–62 of cover 11, these portions 60–62 removably affixed to frame 55 of means 10 for affixing.

Door posts 20, 20' are preferably bolted to headers 16 and 17 at attachment 23 using a flat, slotted tab welded to the terminal end 21 thereof but may be welded directly thereto or have internally threaded receivers in end 21 wherein a bolt is passed through header 16, 17 and threaded into the internally threaded receiver. In the preferred embodiment, the flat, slotted tab is useful in aligning latch member 51 of door 36 with door post 20' such that a latching member 41 may be advantageously used to latch door 36 to door post 20'. Preferably, the top portion 18 of latch member 51 and hinge member 52 of door 36 is curved inwardly thus spacing door 36 from edge 121 of golf cart body 101. Preferably also, door posts 20, 20' are also curved at curved portion 19 adjacent end 21 to allow door 36 to hang vertically alongside golf cart 100. These curved portions 18, 19 are provided to allow door 36 to be fully outside handles 112 of seat 111 as these seat handles 112 generally extend beyond edge 121 of body 101 of golf cart 100, edge 121 defined as the side edge of floor 116. Hinge pin 47 is preferably mounted on an exterior surface of door post 20 such that door 36 may swing freely throughout a 180-degree arc around hinge pin 47 and also to allow top member 39 to close against header 16 or 17 as top curved portion 18 of latch member 51 and hinge member 52 curve inwardly over the plane occupied by seat handles 112. Door 36 is, therefore, self storing in either a fully open position with cover portion 60 thereon or in a fully closed position with cover portion 60 removed therefrom. Of course, door 36 may be lifted free of hinge pin 47 and carried on golf cart 100 or stored separately from golf cart 100. It is readily apparent here that door 36 of the instant invention is readily detachable and easily stored whereas the doors of the prior art covers must be stored apart from the golf cart or have only a portion of the cover thereon removable.

A rotatable latch 41 is provided on latch member 51 of door 36 to releasably latch door 36 to door post 20'. Referring now to FIG. 5, latch 41 comprises a compound curved piece 98 adapted to be fitted around latching member 51, compound curved piece 98 having a stop 71 provided on the edges thereof. Stop 71 is adapted to rest against the inside 119 of latch member 51 in both a latching position as shown in FIG. 5 and an open position (not shown). In the open position, the latch sides 43 of compound shaped piece 98 lie along the edges of latch member 51 with handles 44 protruding away from latch member 51. Latch 41 rotates on latch spindle 42, latch spindle 42 passed through latch member 51 and both latch sides 43, preferably affixed to both latch sides 43 and rotatable within latch member 51. When rotated in the direction of arrow 63 to a fully latched position as shown where latching sides 43 of compound shaped piece 98 lies alongside the edges of door post 20', stop 71 lies against the inside 119 of latch member 51 at a different location than when in the unlatched position, however, stop 71 retains latch 41 in a substantially horizontal position when latched to door post 20'. One handle 44 is provided on each latch side 43 to allow latch 41 to be raised or lowered from inside golfer compartment 115 or outside cart 100.

On some golf carts 100, it may be possible to affix door posts 20, 20' to undercarriage 117 onto bolts provided on undercarriage 117 for affixing a component of golf cart 100 thereto. In this case, a tab such as is welded on open end 21 of door post 20, 20' may be similarly welded on a bottom end 32 of door post 20, 20' this member also having a slot therein for adjustably supporting door post 20 upon undercarriage 117. In any event, door post 20, 20' should be removably affixed to golf cart 100 without drilling any holes into any part of golf cart 100. Similarly, as headers 16, 17 are bolted to existing means 120 for mounting roof 103 to golf cart 100, no new holes need be drilled in any part of golf cart 100. Thus, a frame 55 for removably affixing a cover 11 to a golf cart 100 is provided wherein frame 55 comprises header frame 12 and upright frame members 20, 20', header frame 12 being removably attachable to an existing means 120 for mounting a roof 103 to golf cart 100, and wherein upright frame members 20, 20' are releasably affixed to an undercarriage 117 of golf cart 100. Likewise, as cover portions 60–62 are secured to frame members 16, 17, 20, 20' by wrapping marginal edges therearound and utilizing releasable fasteners along the marginal edges thereof, no new holes or attachments for cover portions 60–62 need be provided on roof supports 104, windshield supports 105 or roof 103 of golf cart 100. Therefore, means 10 for affixing may be removed from a golf cart 100 returning golf cart 100 to its original state and preserving the value thereof.

Though header frame 12 is provided as two headers 16, 17, header frame 12 could be joined at terminal ends 22 and may additionally have telescoping members associated therewith to make header frame 12 universally mountable on various golf carts. Similarly, frontispiece 13 may be joined at assembly of frame 55 to golf cart 100 providing additional support for the windshield or roof 103. Door posts 20, 20' may also be made telescoping within a short distance without requiring replacement of door 36 with a door 36 of different length, however, it is contemplated in this invention to have each of the members 16, 17, 20, 20' adjustable in length to satisfy mounting requirements on the large variety of golf carts 100 available on the market.

A pouch 70 is separately provided for covering golf club bags stored on club carrier 113, pouch 70 having two separate golf bag covers 40 stored therein. Pouch 70 is a bolster sized component which is detachable from cover portion 61 by removing a zippered attachment from cover portion 61. Alternately, pouch 70 may be affixed to or around a basket (not shown) with straps 133 attached to pouch 70 such as to ends 134 thereof. Straps 133 may be a single closed loop such as an elastic strap or may be joined in a continuous loop at the ends 135 thereof with a means 136 for joining on ends 135 such as hook portion 68 and loop portion 69. Alternate means for closure may comprise hooks, buttons, snaps and the like. A closure zipper 46 on pouch 70 may be moved from either side to the other side in order to allow removal of one or both golf bag covers 40 from pouch 70. When not in use, the golf bag covers 40 may be folded and placed within pouch 70. Furthermore, a bolster the width of the windshield may be provided to prevent air flow under the windshield and into golfer compartment 115, the bolster also useful for preventing articles placed on the dash of golf cart 100 from sliding beneath the windshield. The bolster can be a tubular length of fabric from two to six inches in diameter filled with foam particles or granular material having the ends thereof closed to prevent the filling from being expelled.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. A means for affixing an enclosing cover to a golf cart, said means for affixing comprising an upper header, at least two upright support members at least two doors and multiple cover portions, said golf cart having an existing means for mounting a roof to said golf cart, said existing means for mounting comprising at least two roof supports and a plurality of bolts, said roof secured to said roof supports by said plurality of bolts, said bolts disposed through said roof supports and flanges of said roof, said upper header removably affixed to at least one said bolt of said existing means for mounting said roof, said upper header having an upper end of at least one said upright support member affixed thereto, said at least one said upright support member having an opposite end removably affixed to an undercarriage of said golf cart.

2. A means for affixing as in claim 1 wherein said at least one said upright support member has means for removably mounting a hingeable door thereupon, said door comprising a door frame and removable cover portion.

3. A means for affixing as in claim 2 wherein said one said door frame is rotatably mounted upon at least two upwardly projecting hinge pins affixed to said upright support member.

4. A means for affixing as in claim 3 wherein said one said door is removable from said hinge pins.

5. A means for affixing as in claim 4 wherein said upper header and said upright support members are removably affixed to said golf cart.

6. A means for affixing as in claim 3 wherein said one said door is stored in an open position by rotating said door through an arc of substantially 180 degrees whereby said door lies substantially parallel to said golf cart behind a rear one of said upright support members.

7. A means for affixing as in claim 1 wherein said cover portions further comprising multiple fabric portions removably affixed to said upper header, said upright support members and said existing means for mounting.

8. A means for affixing as in claim 1 wherein said upper header has at least one mounting ear removably attached to a protruding end of at least one of said plurality of bolts of said existing means for mounting.

9. A means for affixing as in claim 1 wherein said means for affixing is affixed to said golf cart without drilling holes into any portion of said golf cart.

10. A cover for a golf cart, said cover comprising an upper header, a plurality of upright support members, at least one door and a plurality of cover portions wherein said upper header is removably attached to an existing means for mounting a roof to said golf cart, said upper header having at least two said upright support members affixed thereto, said two said upright support members further releasably affixed to a frame member of the undercarriage of said golf cart and wherein one of said cover portions is removably affixed to said upper header and said two said upright support members.

11. A cover as in claim 10 wherein said another of said cover portions is removably affixed to another of said plurality of said upright support member and to a portion of said existing means for mounting.

12. A cover as in claim 10 wherein said door comprises a door frame and a covering therefor wherein another of said cover portions is removably affixed to said door frame.

13. In a door for a means for affixing an enclosure to a golf cart, said door comprising a frame, a means for removably mounting, a means for latching and a cover for said frame, said frame comprising top, bottom and side marginal edges secured at the ends thereof in a generally rectangular shape, said means for affixing comprising means for hingedly mounting one said marginal edge of said door to a portion of said means for affixing, said means for latching comprising means for latchedly securing another said marginal edge of said door to another portion of said means for affixing, the improvement wherein said cover has means for removably attaching the peripheral edges thereof to said marginal edges of said frame wherein ingress into and egress from said means for affixing said enclosure to said golf cart is effected through said frame when said cover is removed from said frame by removably detaching said peripheral edges of said cover from said marginal edges of said frame.

14. A door as in claim 13 wherein said one said marginal edge of said door is hingedly mounted to a rear door post assembly of said means for affixing.

15. A door as in claim 13 wherein said one said marginal edge of said door is hingedly mounted to a front door post assembly of said means for affixing.

16. A door as in claim 13 wherein said frame has means for providing clearance around seating handles of a seat mounted within a golf cart utilizing said means for affixing.

17. A door as in claim 13 wherein a golfer using said golf cart steps substantially unhindered through said door frame having said cover removed therefrom while said door is stored in a closed position on said golf cart.

* * * * *